F. W. TAYLOR.
CUTTER HOLDING MEANS.
APPLICATION FILED AUG. 25, 1908.
1,015,409.
Patented Jan. 23, 1912.
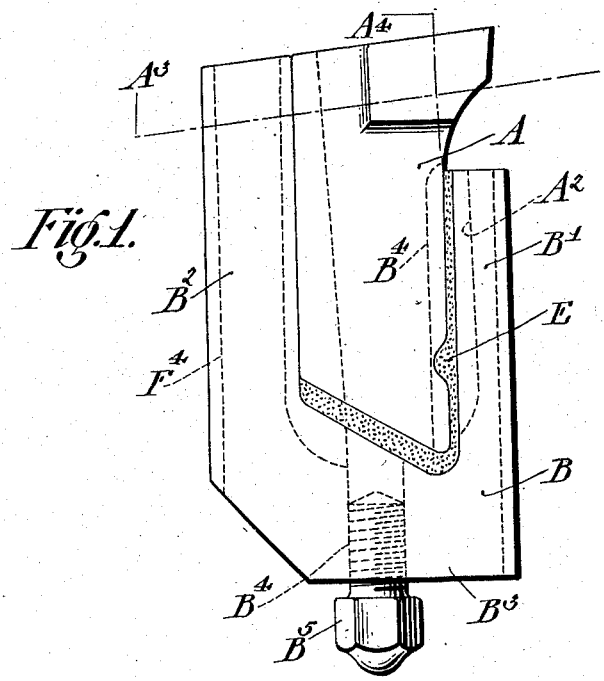
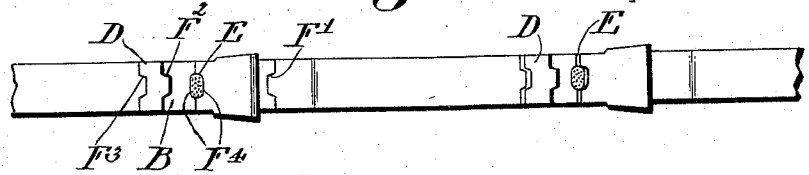
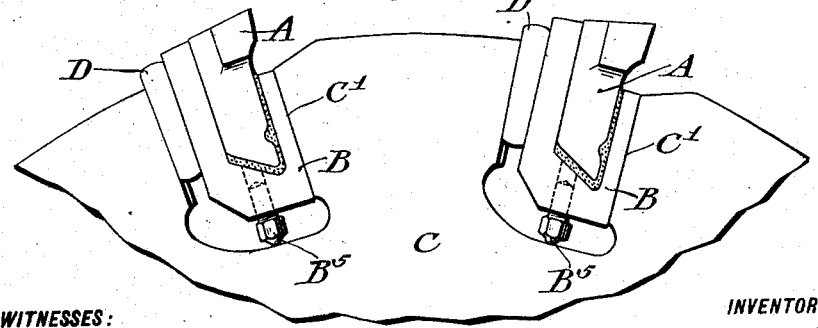
WITNESSES:
INVENTOR
Frederick W. Taylor
BY
ATTORNEY.

UNITED STATES PATENT OFFICE.

FREDERICK W. TAYLOR, OF PHILADELPHIA, PENNSYLVANIA.

CUTTER-HOLDING MEANS.

1,015,409.  Specification of Letters Patent.  Patented Jan. 23, 1912.

Application filed August 25, 1908. Serial No. 450,197.

*To all whom it may concern:*

Be it known that I, FREDERICK W. TAYLOR, a citizen of the United States of America, residing in the city and county of Philadelphia, in the State of Pennsylvania, have invented a certain new and useful Improvement in Cutter-Holding Means, of which the following is a true and exact description, reference being had to the accompanying drawings, which form a part thereof.

The present invention relates to the means employed for securing adjustably and removably cutters in a cutter body, and more particularly to such a construction as is shown in Patent 709,526, granted September 23, 1902, jointly to Sidney Newbold and myself, in which the cutter is held in an individual holder which is adapted to be detachably and adjustably secured in one of a series of chambers in the cutter holder body or blade of a metal cutting saw.

The object of the invention is to improve cutter holder constructions of the kind referred to in such a manner that the maximum cutting effectiveness of which a cutter is capable may be utilized throughout the life of the cutter and regardless of the extent to which it may be ground away. This I accomplish by providing each individual cutter holder with a portion which engages and supports the cutter at practically the extreme outer end of the rear edge of the cutter and is adapted to be ground away with the cutter as the latter is sharpened without diminishing the effectiveness with which the cutter is held in its individual holder or the latter is held in the saw blade.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described one form in which my invention may be embodied.

Of the drawing, Figure 1 is an elevation of an individual cutter holder with the cutter in place; and Fig. 2 is a plan, and Fig. 3 is an elevation of a portion of a metal cutting saw blade with cutters and individual holders therefor in place.

In the drawings, A represents the cutters or saw teeth proper, and B the individual cutter holders. Each saw tooth A is preferably locked in place in its individual holder B by a filling E of fusible metal.

C, represents the saw blade having the pockets or chambers $C^1$ each receiving an individual holder B.

D represents the wedges for securing the holders B in place in the chamber $C^1$.

The holders B are each U shaped and comprise front and rear legs $B^1$ and $B^2$ respectively and a connecting base $B^3$. The latter is tapped at $B^4$ for a rotary adjusting screw $B^5$ by which the holder B may be radially adjusted with respect to the saw blade in which it is mounted. A tongue and groove joint $F^1$ is formed between the front of the holder B and the adjacent edge of the saw blade C. Similarly, tongue and groove joints $F^2$ and $F^3$ are formed between the rear edge of the holder B and the adjacent edge of the wedge D and between the latter and the rear edge of the chamber $C^1$ respectively. The rear edge of each cutter or tooth A and the front edge of the leg $B^2$ of the individual cutter holder are grooved as indicated at $F^4$. The fusible metal filling E is poured into the space left for the purpose between the front edge of each cutter and the adjacent edge of the leg $B^1$ of the corresponding holder B and between the inner end of the cutter and the base $B^3$ of the holder and into the space formed by grooves $F^4$. Grooves $A^2$ and $B^6$ are formed in the front edge of the cutter and the adjacent leg to assist in locking the tool and fusible metal filling in place in the individual holder.

The cutters A are shown in the drawings in their initial form, that is before they have been worn away by grinding necessary from time to time to resharpen the cutters. The line $A^3$ indicates approximately the extent to which the outer end of the tool may be ground away before it becomes necessary to discard the tool. Similarly the line $A^4$ indicates the extent to which the front edge of the tool may be ground away. It will be observed that the rear leg $B^2$ of each holder projects beyond the periphery of the saw blade proper in the initial condition of the tool and engages and supports the rear edge of the tool at substantially its extreme outer edge, thus projecting well beyond the line $A^3$. The portion of the leg $B^2$ extending outward beyond the line $A^3$ is ground away with the outer end of the cutter as the latter is sharpened. It will of course be understood that the wedges D are so chosen and proportioned as not to project too far from the periphery of the saw for any adjustment of the holder or shortening of the cutter. By proceeding in this manner each cutter is supported throughout its life in such a manner as to make it possible to use its maximum cutting effectiveness, as there is no tendency for the cutter to break or shear along line A³ as has been the case in constructions heretofore employed where the rear leg B² of the individual holder did not project to the extreme outer end of the cutter, but stopped at some point about the line of the periphery of the saw blade.

With the new construction the cutter is supported with substantially the same effectiveness throughout the life of the cutter thus making the cutting effectiveness of the cutter uniform throughout the life of the cutter. The cutter holders B are so formed and arranged that the grinding away of the outer end of the leg B² does not appreciably affect the strength of the connection between the holder and the cutter mounted in it or the connection between the holder and the saw blade. It is true that the new construction makes it necessary to scrap each individual cutter holder when its cutter is worn out, but in compensation for this disadvantage there is the advantage of doing away with any temptation to use an individual cutter holder after the use to which it has been put has deteriorated it to such an extent that it is no longer capable of giving the best results.

The cutting teeth as is well known are formed of material which is more expensive than and usually much less resistant to shearing stresses than the cutter holder proper, and the simple change in construction and arrangement described has produced very important practicable results. It has been found by actual use of the invention on an extended scale that it about doubles the capacity of a saw of given dimensions over what has heretofore been obtainable.

Having now described my invention, what I claim as new and desire to secure by Letters Patent is:

1. In combination a U-shaped cutter holder adapted to be received in a chamber in a saw blade, with one leg in front of the other with respect to the plane of the saw blade, and a cutting tooth secured in said holder between the legs thereof with its outer end terminating in a cutting edge in front of the rear leg of said holder, said rear leg being initially extended to engage and support said cutting tooth along substantially the entire rear edge of the latter and adapted to be ground away with the outer end of the tooth as the latter is sharpened from time to time without materially diminishing the effectiveness of the holder as a support for the cutting tooth held in it.

2. A metal cutting saw comprising a blade having a series of chambers at its periphery, a series of U-shaped cutter holders secured one in each of said chambers with one leg of the holder in front of the other with respect to the plane of the saw blade and cutting teeth secured one in each holder between the legs thereof and each having its outer end terminating in a cutting edge in front of the rear leg of its holder, said rear leg being initially extended to engage and support said cutting tooth at substantially the extreme outer end thereof and adapted to be ground away with the outer end of the tooth as the latter is sharpened from time to time without materially diminishing the effectiveness of the holder as a support for the cutting tooth held in it.

FREDERICK W. TAYLOR.

Witnesses:
ARNOLD KATZ,
D. STEWART.

Copies of this patent may be obtained for five cents each, by addressing the "Commissioner of Patents Washington, D. C."